United States Patent [19]

Sharangpani

[11] Patent Number: 5,768,169

[45] Date of Patent: Jun. 16, 1998

[54] METHOD AND APPARATUS FOR IMPROVED PROCESSING OF NUMERIC APPLICATIONS IN THE PRESENCE OF SUBNORMAL NUMBERS IN A COMPUTER SYSTEM

[75] Inventor: Harshvardhan Sharangpani, Santa Clara, Calif.

[73] Assignee: Intel Corporation, Santa Clara, Calif.

[21] Appl. No.: 537,007

[22] Filed: Oct. 2, 1995

[51] Int. Cl.⁶ ........................................... G06F 7/38
[52] U.S. Cl. ........................... 364/748; 364/715.03
[58] Field of Search .......................... 364/748, 715.03, 364/715.04, 715.1, 736, 736.5, 745; 341/88

[56] References Cited

U.S. PATENT DOCUMENTS

| | | | |
|---|---|---|---|
| 4,338,675 | 7/1982 | Palmer et al. | 364/748 |
| 4,949,291 | 8/1990 | Saini | 364/715.03 |
| 5,357,237 | 10/1994 | Bearden et al. | 340/146.2 |
| 5,452,241 | 9/1995 | Desrosiers et al. | 364/748 |
| 5,487,022 | 1/1996 | Simpson et al. | 364/715.04 |
| 5,523,961 | 6/1996 | Naini | 364/715.03 |
| 5,572,207 | 11/1996 | Harding et al. | 341/62 |
| 5,631,859 | 5/1997 | Markstein et al. | 364/748 |

Primary Examiner—Reba I. Elmore
Assistant Examiner—Emmanuel L. Moise
Attorney, Agent, or Firm—Blakely, Sokoloff, Taylor & Zafman

[57] ABSTRACT

An apparatus for storing data in a computer memory, the number originating from one of a plurality of floating point data formats. Each data format from which the number originates has a first exponent bias and a minimum exponent value. The number has a first exponent and an unbiased exponent value, the unbiased exponent value equal to the difference between the first exponent and the first exponent bias. The number also has a sign and a significand. The apparatus for storing the number in computer memory consists of at least one sign bit and a significand having an explicit integer bit, the explicit integer bit having a first predetermined value when the number is normal and having a second predetermined value when the number is denormal. The apparatus also has a second exponent with a second exponent bias, the second exponent equal to the sum of the unbiased exponent value and the second exponent bias when the number is normal, the second exponent equal to the sum of the minimum exponent value and the second exponent bias when the number is denormal.

19 Claims, 3 Drawing Sheets

METHOD AND APPARATUS FOR IMPROVED PROCESSING OF NUMERIC APPLICATIONS IN THE PRESENCE OF SUBNORMAL NUMBERS IN A COMPUTER SYSTEM

BACKGROUND

1. Field of the Invention

The invention relates to the field of floating point numbers, and more particularly to the storage of floating point numbers in a digital computer system.

2. Art Background

An exemplary microprocessor, such as the Pentium® processor, which is a product of Intel Corporation, Santa Clara, Calif., represents real numbers of the form $(-1)s2E$ $(b_0b_1b_2b_3..b_{p-1})$ where:

s=0 or 1

E=any integer between Emin and Emax, inclusive bi=0 or 1 p=number of bits of precision

Table 1a summarizes the parameters for each of the three real-number formats. The Pentium® processor stores real numbers in three-field binary format that resembles scientific, or exponential notation. The significant field, $b_0b_1b_2b_3..b_{p-1}$, is the number's significant digits. (The term "significant" is the same as to the term "significant" used to describe floating-point numbers on some computers.) The exponent field, e+E=bias, locates the binary point within the significant digits (and therefore determines the number's magnitude). (The term "exponent" is analogous to the term "characteristic" used to describe floating-point numbers on some conventional computers.) A 1-bit sign field indicates whether the number is positive or negative. Negative numbers differ from positive numbers only in the sign bits of their significants.

TABLE 1a

|  | Single | Double | Extended |
|---|---|---|---|
| Total Format Width | 32 | 64 | 80 |
| p (bits of precision) | 23 | 53 | 64 |
| Exponent bits | 8 | 11 | 15 |
| Emax | +127 | +1023 | +16383 |
| Emin | −126 | −1022 | −16382 |
| Exponent Bias | +127 | +1023 | +16383 |

The single real format is appropriate for applications that are constrained by memory, but it should be recognized that this format provides a smaller margin of safety. It is useful for the debugging of algorithms, because roundoff problems will manifest themselves more quickly in this format. It is often used in graphics applications as well. For most microcomputer applications over the last decade, the double real format has provided sufficient range and precision to return correct results with a minimum of programmer attention. Most processors have optimized their computational paths to provide the maximum performance on operations on the double real format. The extended real format was originally developed with an intent to hold intermediate results, loop accumulations, and constants. Its extra length was designed to shield final results from the effects of rounding and overflow/underflow in intermediate calculations.

As microprocessor performance increases (by taking advantage of the improvements in the technology of Very Large Scale Integration), applications develop that exploit this increase in performance to deliver more utility. These new applications operate on larger data sets and invoke more complex calculations that are more prone to roundoff errors. The extended format is useful in these applications, not just as an intermediate format, but also as a format for input and output operands. With the need to support the extended format as outlined above, future processors must now be designed to support computation on three real number floating point formats in their computational paths.

The floating point unit (FPU) of the processor usually retains floating point numbers in normalized form. This means that, except for the value zero, the significand contains an integer bit and fraction bits as follows:

1.fff...ff where "." indicates an assumed binary point. The number of fraction bits varies according to the real format: 23 for single, 52 for double, and 63 for extended real. By normalizing real numbers so that their integer bit is always a 1, the processor eliminates leading zeros in small values. This technique maximizes the number of significant digits that can be accommodated in a significand of a given width. Note that, in the single and double formats, the integer bit is implicit and is not actually stored in memory; the integer bit is physically present (explicit) in the extended format only.

If one were to examine only the significand with its assumed binary point, all normalized real numbers would have values greater than or equal to one and less than two. The exponent field locates the actual binary point in the significant digits. Just as in decimal scientific notation, a positive exponent has the effect of moving the binary point to the right, and a negative exponent effectively moves the binary point to the left, inserting leading zeros as necessary. An unbiased exponent of zero indicates that the position of the assumed binary point is also the position of the actual binary point.

The exponent field, then, determines a real number's magnitude. In order to simplify comparing real numbers (e.g., for sorting), the processor stores exponents in a biased form. This means that a constant, called a bias, is added to the true exponent described above. As Table 1a shows, the value of this bias is different for each real format. The bias is chosen so as to force the biased exponent to be a positive value. A number's true exponent can be determined simply by subtracting the bias value of its format. In the x86 family of processors produced by a product of Intel Corporation, the single and double real formats exist in memory only. If a number in one of these formats is loaded into an FPU register, is automatically converted to extended format, the format used for all internal operations. Likewise, data in registers can be converted to single or double real for storage in memory.

When a numeric value becomes very close to zero, normalized floating-point storage cannot be used to express the value accurately. A number R is said to be tiny (also commonly referred to as subnormal) when −2Emin<R<0 or 0<R<+2Emin. (For a typical case, Emin is −126 for single format, −1022 for double format, and −16382 for extended format.) In other words, a nonzero number is tiny if its exponent would be too negative to store in the destination format, while retaining the number in normalized form.

To accommodate these instances, the processor can store and operate on real numbers that are not normalized, i.e., whose significants contain one or more leading zeros. Denormals arise when the result of a calculation yields a value that is tiny.

Denormal values have the following properties:

The biased floating-point exponent is stored at its smallest value. For single precision numbers, this minimum exponent value is −126. For double precision, the minimum exponent value is −1022. For the extended precision format, the minimum exponent value is −16382.

For all formats, when the number is denormal the minimum exponent is encoded with a bit pattern of all zeros.

The integer bit of the significand (whether explicit or implicit) is zero.

It is important to note that interpretation of the exponent encoding for denormal numbers differs from the interpretation of the exponent encoding for normalized numbers. For denormalized numbers, the exponent is encoded with the bit pattern of all zeros, although this pattern is interpreted to have a value which is the minimum exponent value (which is −126 for single format, −1022 for double real format, and −16382 for the extended real format). Hence, interpreting such denormal numbers by merely adding the bias of the format to the exponent encoding of the denormal number will produce an exponent value that is off by one. Remember, denormals and true zeros both have exponents encoded with all zeros, although the interpretation of these encodings differ.

As a number becomes smaller, it gradually transitions from a normal representation to a denormal representation. Table 1b below illustrates this process for a single precision number.

TABLE 1b

| Exponent Value | Significand Value (includes explicit bit) | Exponent Encoding | Significand Encoding (no explicit bit) | Description of number |
|---|---|---|---|---|
| 1. 0 × 3f81 | 1.0000000 . . . 01 | 00000001 | 0000000 . . . 01 | Smallest single |
| 2. 0 × 3f81 | 1.0000000 . . . 00 | 00000001 | 0000000 . . . 00 | precision normal |
| 3. 0 × 3f81 | 0.1111111 . . . 11 | 00000000 | 1111111 . . . 11 | Largest single precision |
| 4. 0 × 3f81 | 0.1111111 . . . 10 | 00000000 | 1111111 . . . 10 | denormal |
| 5. 0 × 3f81 | 0.0000000 . . . 01 | 00000000 | 0000000 . . . 01 | Smallest single precision denormal |
| 6. 0 × 0000 | 0.0000000 . . . 00 | 00000000 | 0000000 . . . 00 | True Zero |

Entry one in Table 1b shows a normal number which is very close to becoming denormal. Entry two shows the smallest possible normal number which can be stored in the single format. Entry three shows the denormal number which results when the normal number in entry two loses a value equal to one digit in the last place. The exponent of the number is encoded as zero, although its value remains at the minimum exponent for a single precision number. The significand bits are set to all ones. Entry five shows the smallest denormal number which can be represented by the single precision format.

Denormals typically receive special treatment by processors in three respects:

The processor avoids creating denormals whenever possible. In other words, it always normalizes real numbers except in the case of tiny numbers.

The processor provides the unmasked underflow exception to permit programmers to detect cases when denormals would be created.

The processor provides the unmasked denormal operand exception to permit programmers to provide a tailored response in the presence of denormal operands.

Denormalizing means incrementing the true result's exponent by a certain amount, and inserting a corresponding number of leading zeros in the significand, shifting the rest of the significand by the same amount to the right. Denormalization produces either a denormal or a zero.

The denormalization process causes loss of precision if significant low-order bits are shifted off the right end of the significand field. In a severe case, all the significant bits of the true results are shifted off and replaced by the leading zeros. In this case, the result of denormalization yields a zero.

Typical prior art implementations map floating point data loaded from memory to the FPU from the originating format in memory to the extended format in the FPU registers. This mapping in the prior art has entailed, on a load instruction, a full conversion of the data from the originating format into the extended precision format. Likewise, on the store instruction, this has entailed a complete conversion of the data from the extended precision format (in the FPU register file) to the destination format of the result in memory.

In the prior art, conversion of the data on the load instruction typically includes the following:

Detection of denormal numbers in the originating format.

Generating an exception when the input operand is a denormal number and the denormal exception is unmasked.

Normalization of the denormal number in the event that the input operand is a denormal number and the denormal exception is masked.

Examination of the input operand to check whether it is encoded to have a special interpretation, such as a signaling Not-A-Number (NaN) encoding. If this is true, the FPU delivers an interrupt for the invalid operation exception when the invalid operation exception is unmasked.

As can be seen from the above, implementations on the prior art must examine the input operand being loaded in order to determine whether there will be any exceptions. Exceptions include the denormal operand exception response and the invalid operation exception response. Thus, implementations on the prior art incur data-related exceptions upon the loading of floating point operands.

In the event that the denormal operand exception is masked, most prior art processors must normalize input operands which are denormal numbers. This normalization operation requires, among other circuits, a hardware shifter. Modern processors typically execute several load instructions in parallel, requiring potentially several dedicated shifters on the chip. Since dedicated hardware for multiple shifters is expensive in terms of silicon die cost, some implementations may use schemes by which several load paths to the FPU arbitrate for a single shifter, adding design complexity. A more common alternative is to complete the normalization process by invoking on-chip microcode. Upon determining that the data being loaded is denormal, a micro-exception delivers control to a microcode handler. The microcode handler uses existing shifters in the FPU (shifters necessary for supporting the floating point add operation, for example) to execute the normalization of the loaded operand. Thus, implementations on the prior art need to provide either dedicated shifters for each load path, added design complexity to arbitrate for a single shifter, or take a micro-exception to enable microcode to complete the normalization.

Modern pipelines processors employ techniques that include deep pipelining, as well as parallel instruction execution. These modern processors execute several instructions concurrently at each stage of the pipeline. Typically, a load operation on these processors takes several cycles to complete its execution. A common prior art technique is to enable execution of instructions following a load instruction even before the loaded data is returned, as long as the subsequent instructions do not depend upon the loaded data. To complete the execution of these subsequent instructions, and to update the architectural state of the FPU with the result of these instructions, it is important to determine that there are no exceptions or micro-exceptions on all prior instructions.

Because the FPU takes several cycles to complete a load instruction, and because the load instruction may incur data-related exceptions or micro-exceptions, it is necessary to temporarily retain the execution results of instructions following the load instruction in a buffer (sometimes called a retirement buffer). The results are retained until such time as any data-related exceptions or micro-exceptions incurred by the load instruction are determined. Because it takes several cycles to make this determination, and because modern processors execute several instructions in parallel, the number of instructions subsequent to the load that will execute before the determination is made may be very large. A very large retirement buffer is then required to store these pending results. The size of this buffer poses an appreciable cost both in terms of silicon die cost as well as design complexity.

Solutions that eliminate the possibility of data-related exceptions on loads will eliminate the need for such a buffer for the purposes of the load instruction. For the most common modern implementations, this will completely eliminate the need for the retirement buffer. Such implementations can employ a simple register scoreboard for the book-keeping of incoming load data.

For modern processors, a solution is needed that provides efficient computational support for the three memory formats (single, double, and extended) that accommodate denormalized numbers, simultaneously eliminating the following:

Data-related exceptions or data-related micro-exceptions during loading of floating point operands.

The need for one dedicated shifter per load path.

The need for complex arbitration hardware, in order to use a single shifter to support normalization of denormal numbers on multiple load paths.

SUMMARY OF THE INVENTION

The invention is a method and apparatus for storing both normal and denormal representations of a floating point number originating in a plurality of formats. Floating point data is converted from a plurality of floating point data formats to a unified data format using commonly available logic components. The unified format provides a redundant encoding for denormal numbers originating in the single and double data formats. The apparatus avoids the necessity of normalizing denormal numbers during floating point operand loads, and also eliminates data-related exceptions or micro-exceptions during load operations. The apparatus consists of at least one sign bit, a plurality of significand bits including an explicit integer bit, and a plurality of exponent bits having an exponent bias. The integer bit is set to a first predetermined value when the data is normal and set to a second predetermined value when the data is denormal. When the data is normal, or when the data originates in the extended format, the exponent bits are set to the value of the sum of the unbiased exponent of the data and the exponent bias of the originating data format. When the data is denormal and originating in the single or double real formats, the exponent bits are set to the value of the sum of the minimum exponent value of the originating data format and the exponent bias of the unified format.

DETAILED DESCRIPTION

In the following description, numerous specific details are set forth such as circuits, flow diagrams, etc, in order to provide a thorough understanding of the present invention. In other instances, well-known structures and techniques have not been shown in detail because to do so would unnecessarily obscure the present invention.

The specific arrangements and methods described herein are merely illustrative of the principles of the invention. Numerous modifications in form and detail may be made by those of ordinary skill in the art without departing from the scope of the present invention. For example, the invention described herein is not limited to any particular number of bits in either the significand or exponent fields of the data format.

The present invention improves the efficiency of computations upon floating point numbers in modern advanced microprocessors by using a novel unified floating point format which accommodates data originating in the single, double, and extended data formats. A minimum of conversion logic is required, without the necessity of normalizing data from the originating format. In the preferred embodiment, commonly available logic circuits are used to convert both normal and denormal numbers in computer memory originating from single, double, and extended format into a unified format. In the preferred embodiment, the originating format is embodied in random access memory or cache memory, and the unified format is embodied in a register. However, alternate embodiments are possible, for example, which embody the originating format in one register and the unified format in a second register.

Figure 1:
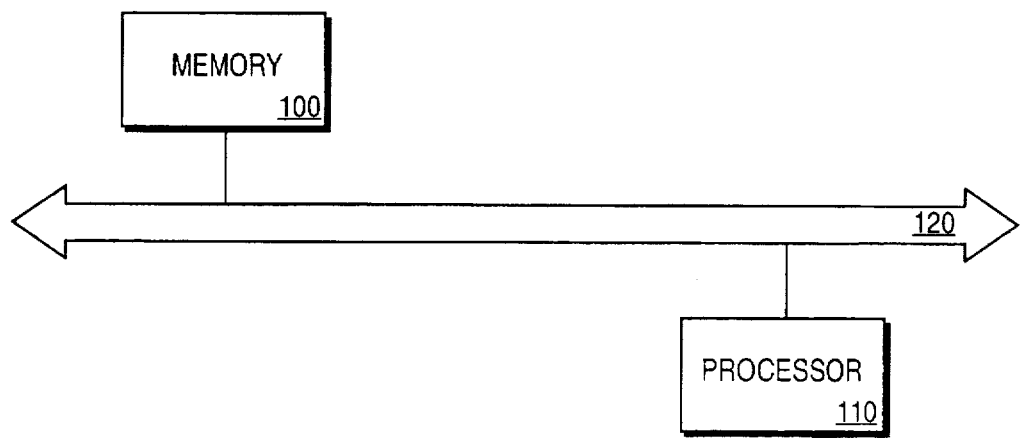
FIG. 1. shows the elements of a system for processing floating point numbers in a computer.

FIG. 1 shows the elements of a system for processing floating point numbers in a computer. The system comprises a processor 110 for executing instructions. Instructions are typically stored in a memory such as the one shown in element 100. The memory 100 may be a Random-Access-Memory (RAM), a cache memory, a Read-Only-Memory (ROM), a flash memory, or any other form of memory device which is capable of storing instructions which are executed by a processor element 110. Instructions are typically supplied to the processor 110 over bus element 120. In this example the memory 100 and the processor 110 are shown as separate elements, however, one skilled in the art will readily appreciate that the memory 100 and the processor 110 may be combined into a single integrated device, such as with on-chip flash memories. In addition to storing instructions for execution on the processor, memory 100 may also store data to use with those instructions and temporary variables and other intermediate information resulting from execution of those instructions. One of ordinary skill in the art will also appreciate that bus element 120 may be implemented in numerous ways familiar in the art of processor system design, for example, using an electrically conductive material, or using optical coupling.

The computer system may include registers for storing data, instructions, and pointers for managing execution of the computer program. The system may include integer registers for storing data with an integer format, floating point registers for storing data with a floating point format, and registers for storing both integer format and floating point format data. The system may include control and status registers for managing execution of a computer program. Control and status registers may include an instruction pointer register (IP) for storing the address of the next instruction to be executed. Control registers may include stack registers for managing the execution stack of a computer program. Control and status registers may also include one or more flag registers for managing the evaluation of conditional statements in the computer program. The computer system may also include address registers for storing the addresses of instructions and data. Address registers may include base, index, and offset registers for managing the different addressing modes in both segmented and flat memory architectures.

Figure 2:
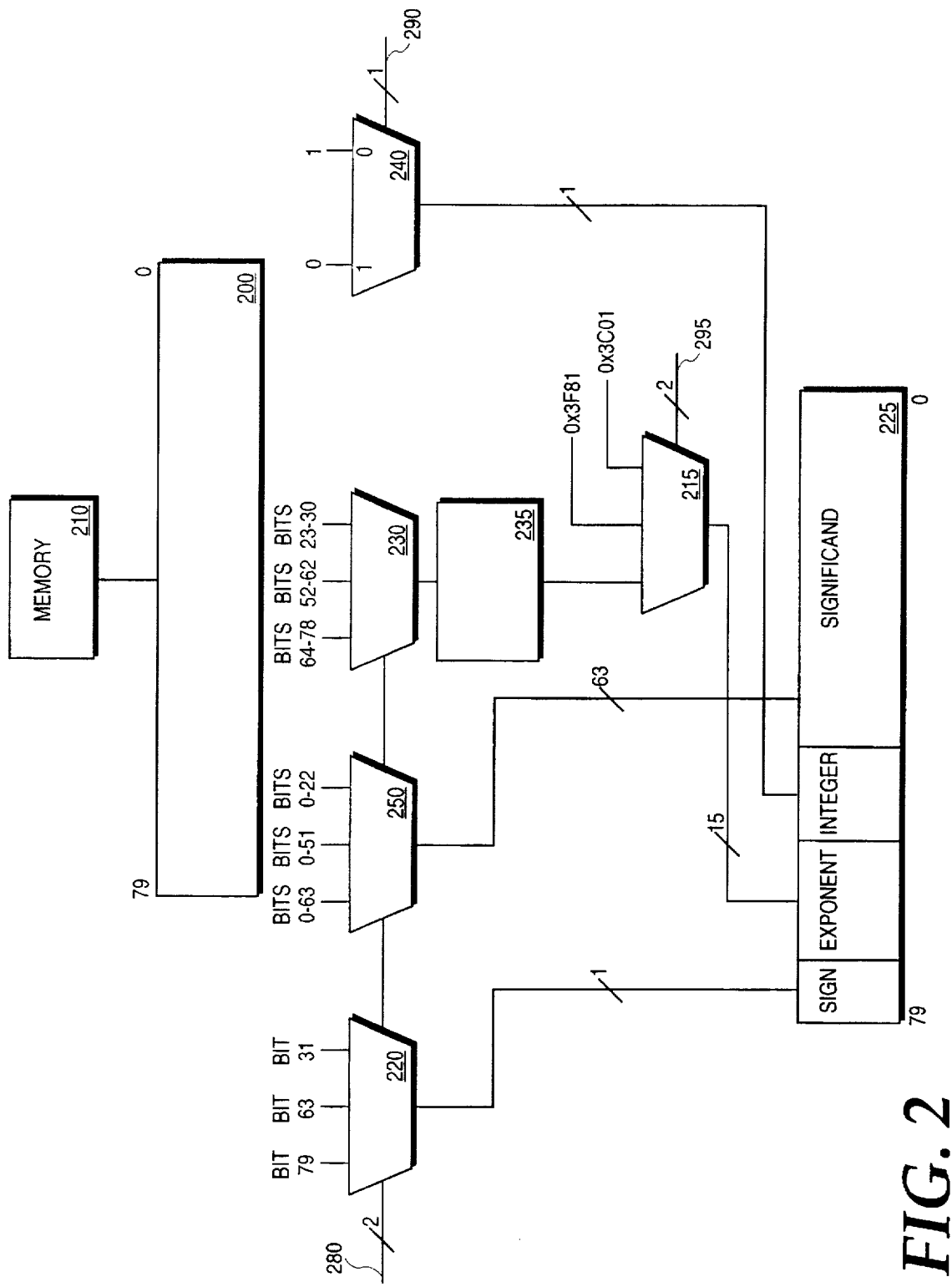
FIG. 2. shows the preferred embodiment of a circuit for loading and storing floating point numbers originating from single, double, and extended format into a unified format.

FIG. 2 shows the preferred embodiment of a circuit for loading floating point numbers originating from single, double, and extended format and converting those numbers into a unified format. Data register 200 is comprised of bit fields representing the fields of a floating point number in one of three formats; single precision, double precision, or extended precision. Memory 210 stores a floating point number in one of three formats; single precision, double precision, and extended precision. In the present embodiment, memory 210 is a RAM, however, one skilled in the art will readily appreciate that other types of memory could be used without departing from the scope of the invention. For example, flash, ROM, cache, or a register memory could be used without departing from the scope or spirit of the invention. Multiplexer 220 has three inputs representing the sign bit to use for the converted number. In the preferred embodiment, for single precision numbers, the sign bit is taken from bit position 31 of the number in floating point register 200. For double precision numbers, the sign bit is taken from bit position 63, and for extended precision numbers the sign bit is taken from bit position 79.

Multiplexer 230 has three inputs representing the exponent field of the floating point number. For single precision numbers, the exponent field is selected from bits 23 through 30 of the number in register 200. For double precision numbers, the exponent field is selected from bits 52 through 62. For extended precision numbers, the exponent field is selected from bits 64 through 78. The exponent field, the sign bit, and the significand are selected using format select signal 280. The selected exponent is input to bias circuit 235. The bias circuit 235 re-biases the number from the originating format to the unified format. Various biasing circuits, well known by those of ordinary skill in the art of microprocessor design, may be employed. The typical function of such a biasing circuit 235, regardless of the actual circuitry involved, is to first subtract from the selected exponent the bias of the originating format. The bias of the unified format is then added to the exponent by the biasing circuit 235.

When the number is normal, or when the number originates in the extended format, multiplexer 215 selects the output of bias circuit 235 to become the exponent of the unified format. For single and double precision denormal numbers, multiplexer 215 selects a value equal to the sum of the minimum exponent value for the originating format and the exponent bias of the unified format. For example, when the minimum exponent of the originating format is −126 (single precision format), and the bias of the unified format is +16383, the value 0x3f81 is selected for denormal numbers (16383d−126d=0x3f81). For double precision denormal numbers, the value 0x3c01 is selected for the exponent of the unified format, using a similar computation and a minimum exponent value of −1022. The exponent of denormal numbers is encoded as zero; however, the exponent for denormal numbers is interpreted by the FPU to be the minimum exponent value for that format. Therefor, merely adding the unbiased exponent of the denormal number to the exponent bias of the unified format will not form an accurate exponent for the unified format. Instead, the minimum unbiased exponent value of the originating format must be added to the exponent bias of the unified format to generate a correct exponent value.

Select signal 295 selects the value to use for the exponent of the unified format. Select signal 295 is generated by detecting when the number is denormal and originates in the single or double precision format. Circuitry for detecting single and double precision denormals, as well as for detecting numbers originating in the extended format, is well known to those of ordinary skill in the design of computer processors.

Multiplexer 240 has two inputs representing the explicit integer bit to use for the converted number. In the preferred embodiment, select signal 290 is asserted when the number is denormal. If the number is normal, then select signal 290 is not asserted and the value one (1) is selected for the explicit integer bit of the number in the unified format. If the number is denormal, then the value zero (0) is selected for the explicit integer bit.

One consequence of not normalizing single and double precision denormal numbers is that two encodings are possible for a subset of the floating point numbers represented by the unified format. More specifically, the subset of $2^{23}$ single precision denormals (assuming 23 bits of significand) and $2^{52}$ double precision denormals (assuming 52 bits of significand) will have two possible encodings in the unified format. For example, consider the (denormal) single precision number $+2^{-126}*0.1110$. This number is denormal because the exponent is at the minimum value for the single precision format, and the implicit integer bit is zero. This number has two possible encodings in the unified format; denormalized and normalized. The denormalized encoding is $+2^{0x3f81}*0.1110$, where the exponent has been replaced with the sum of the minimum exponent value for the single precision format and the exponent bias of the unified format. The normalized format is $+2^{-127}*1.110$, where the number has been normalized by left-shifting the significand and decrementing the exponent.

Multiplexer 250 has three inputs representing the significand to use for the converted number. In the preferred embodiment, for single precision numbers, the significand is taken from bit positions 0 through 22 and padded with zeros. For double precision numbers, the significand is taken from bit positions 0 through 51 and padded with zeros, and for extended precision numbers the significand is taken from bit positions 0 through 63. The number, once converted to the unified format, is stored in register 225.

It is apparent from FIG. 2 that the hardware costs associated with loading floating point numbers from computer memory, and the complexity of the load process when denormal numbers are encountered, are considerably reduced using the present invention. On the present invention, there is no denormal operand exception defined for the load instruction, neither masked, nor unmasked. Further, denormal numbers are loaded without being normalized, which simplifies the load path hardware by eliminating the need for normalizers, and simplifies design complexity by eliminating the need for arbitration logic when a single normalizer is used by multiple load paths. Also, data-related exceptions and micro-exceptions are no longer generated on the load path, which substantially reduces the size and complexity of the retirement buffer of the FPU. Instead, these exceptions are generated at the time when the number is actually used as on operand by an executing instruction.

Figure 3:
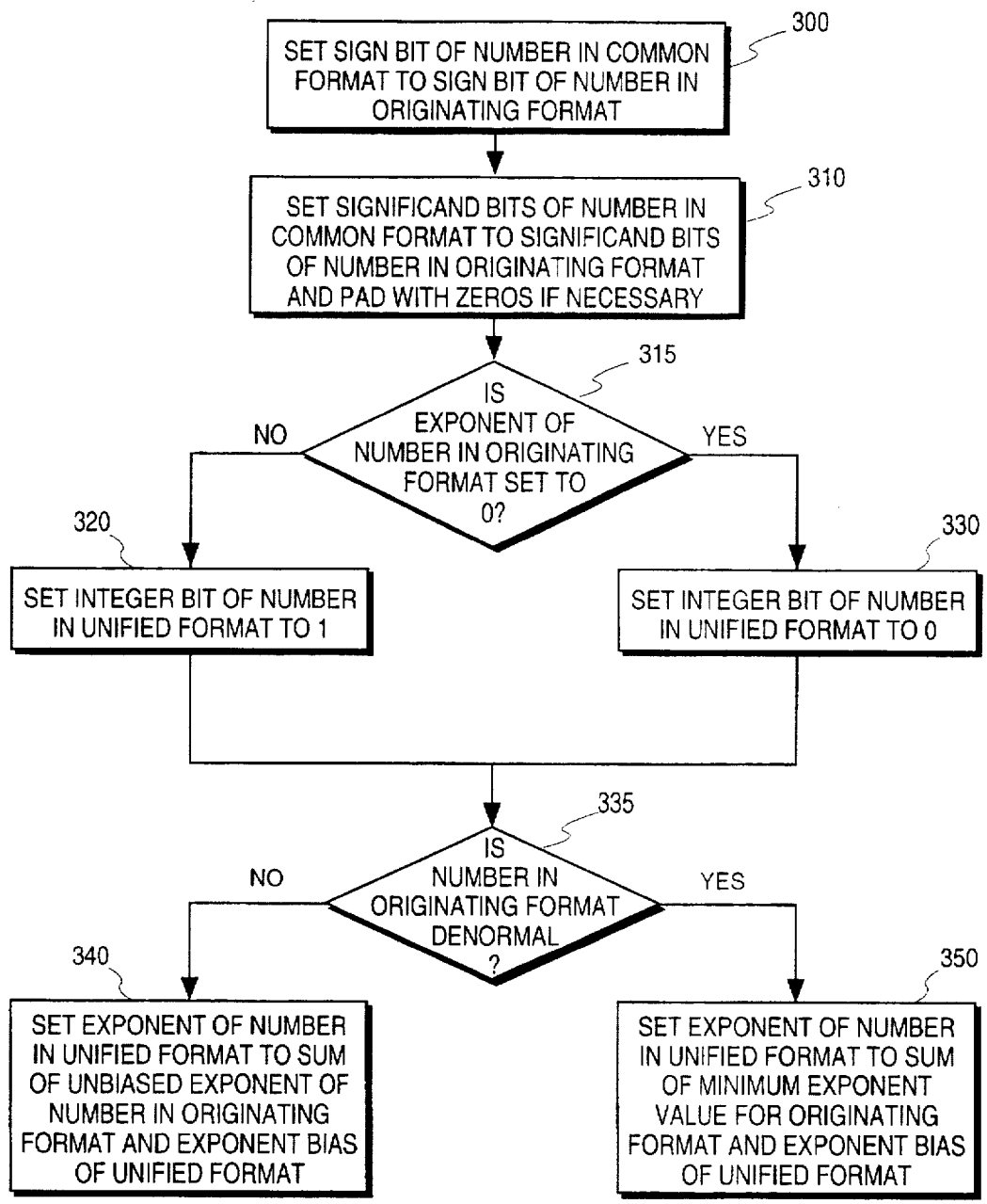
FIG. 3. illustrates the steps of a method for converting both normal and denormal floating point numbers from the single, double, and extended formats to a common register format.

FIG. 3 illustrates the steps of a method for converting both normal and denormal floating point numbers originating from the single, double, and extended formats to a unified format. The first step is setting the sign bit of the number in the unified format to the sign bit of the floating point number 300. After setting the sign bit the next step is setting the significand bits of the number in the unified format to the significand bits of the floating point number 310. In the preferred embodiment, additional significand bits of the number in the unified format which are not set from the significand bits of the floating point number are set to zero.

If the exponent of the number is encoded as zero, then the explicit integer bit of the number in the unified format is set to zero (decision step 315) 330. An exponent encoded as zero is indicative of either a denormal number, or a true zero. Otherwise the explicit integer bit is set to one 320. If the number is normal 335, the exponent of the number in the unified format is set to equal the sum of (1) the unbiased exponent of the number, and (2) the exponent bias of the unified format 340. If the number is denormal, then the exponent of the number in the unified format is set to the sum of (1) the minimum exponent value for the originating format, and (2) the exponent bias of the unified format 350.

Alternative methods are possible which do not substantially depart from the scope and spirit of the invention. For example, the order of the steps may be altered so that the significand bits are set before the sign bits, or the exponent is set prior to the significand or sign bits. Also, the significand bits other than those set from the significand bits of the number to convert may be set to a value other than 0. The steps of setting the sign bit, significand bits, and exponent bits of the unified format can be performed in parallel without departing from the scope of the invention.

Although this invention has been shown in relation to a particular embodiment, it should not be considered so limited. Rather, the invention is limited only by the scope of the appended claims.

We claim:

1. An apparatus for loading a floating point number held in a storage location in either a single, double, or extended precision format to a register of a processor in a unified format, the apparatus comprising:

circuitry which detects whether the floating point number is in the storage location in the single, double, or extended precision format, and whether the floating point number is normal or denormal;

a first multiplexer coupled to the circuitry, the storage location, and the register, the first multiplexer selecting either a first, second, or third bit position of the storage location as a sign bit of the floating point number in the unified format depending on whether the floating point number is in the storage location in the single, double, or extended precision format, respectively;

a second multiplexer coupled to the circuitry and the storage location, the second multiplexer selecting either a first, second, or third bit field of the storage location as an exponent output depending on whether the floating point number is in the storage location in the single, double, or extended precision format, respectively;

a third multiplexer coupled to the circuitry, the storage location, and the register, the third multiplexer selecting either a fourth, fifth, or sixth bit field of the storage location as a significand field of the floating point number in the unified format depending on whether the floating point number is in the storage location in the single, double, or extended precision format, respectively;

a biasing circuit that produces a re-biased exponent from the exponent output of the second multiplexer;

a fourth multiplexer coupled to the circuitry and the register, the fourth multiplexer selecting either the re-biased exponent, a first constant value, or a second constant value as an exponent field of the floating point number in the unified format, the re-biased exponent being selected when the floating point number in the storage location is either normal or is in the extended precision format, the first constant being selected when the floating point number in the storage location is denormal and is in the single precision format, the second constant being selected when the floating point number in the storage location is denormal and is in the double precision format; and a fifth multiplexer coupled to the circuitry and the register, the fifth multiplexer selecting either 0 or 1 as an integer bit of the floating point number in the unified format depending on whether the floating point number in the storage location is denormal or normal, respectively.

2. The apparatus of claim 1 wherein the first constant value is 0×3f81 hexadecimal.

3. The apparatus of claim 1 wherein the second constant value is 0×3c01 hexadecimal.

4. The apparatus of claim 1 wherein the storage location comprises a random-access memory location.

5. The apparatus of claim 1 wherein the first, second, and third bit positions of the storage location comprise bit positions 31, 63, and 79, respectively.

6. The apparatus of claim 1 wherein the first, second, and third bit fields of the storage location comprise bit positions 23–30, 52–62, and 64–78, respectively.

7. The apparatus of claim 1 wherein the fourth, fifth, and sixth bit fields of the storage location comprise bit positions 0–22, 0–51, and 0–63, respectively.

8. The apparatus of claim 1 wherein the floating point number in the unified format has the sign bit located at bit position 79, the exponent field at bit positions 64–78, the integer bit at bit position 63, and the significand at bit positions 0–62.

9. An apparatus for loading a floating point number from a memory to a register of a processor in a unified format, the floating point number being stored in the memory in either a single, double, or extended precision format, the apparatus comprising:

a first means for detecting whether the floating point number is stored in the memory in either the single, double, or extended precision format, and whether the floating point number stored in the memory is normal or denormal;

a second means coupled to the first means and the register for selecting a sign bit, a significand, and an exponent field from the floating point number stored in the memory depending on whether the floating point number is stored in the memory in the single, double, or extended precision format, respectively;

a third means coupled to the first and second means for re-biasing the exponent field selected by the second means to the unified format;

a fourth means coupled to the first and second means and the register for selecting either the re-biased exponent field, a first constant value, or a second constant value as the exponent of the floating point number in the unified format depending on whether the floating point number stored in the memory is normal or is in the extended precision format, is denormal and is in the single precision format, or is denormal and is in the double precision format, respectively; and a fifth means coupled to the first means and the register for selectively setting an integer bit of the floating point number in the unified format depending on whether the floating point number stored in the memory is normal or denormal.

10. The apparatus of claim 9 wherein the second means loads the sign bit and significand directly into the register.

11. The apparatus of claim 9 wherein the first, second, fourth and fifth means each comprises a multiplexer.

12. The apparatus of claim 9 wherein the first constant value is 0×3f81 hexadecimal.

13. The apparatus of claim 9 wherein the second constant value is 0×3c01 hexadecimal.

14. The apparatus of claim 9 wherein the first, second, and third bit positions of the floating point number stored in the memory comprise bit positions 31, 63, and 79, respectively.

15. The apparatus of claim 9 wherein the first, second, and third bit fields of the floating point number stored in the memory comprise bit positions 23–30, 52–62, and 64–78, respectively.

16. The apparatus of claim 9 wherein the fourth, fifth, and sixth bit fields of the floating point number stored in the memory comprise bit positions 0–22, 0–51, and 0–63, respectively.

17. The apparatus of claim 9 wherein the floating point number in the unified format has the sign bit located at bit position 79, the exponent field at bit positions 64–78, the integer bit at bit position 63, and the significand at bit positions 0–62.

18. A method of loading a floating point number from a memory to a register in a processor in a unified format, the floating point number being stored in the memory in an originating format, the method comprising the steps of:

(a) setting a sign bit of the floating point number in the unified format to correspond to a sign bit of the floating point number in the originating format;

(b) setting a significand bit field of the floating point number in the unified format to correspond to a significand bit field of the floating point number in the originating format;

(c) setting an integer bit of the floating point number in the unified format to either 0 or 1 depending on whether the floating point number in the originating format is normal or denormal, respectively;

(d) if the floating point number in the originating format is normal, setting an exponent bit field of the floating point number in the unified format to a sum of an unbiased exponent of the floating point number in the originating format and an exponent bias of the unified format; otherwise, (e) setting an exponent bit field of the floating point number in the unified format to a sum of a minimum exponent value of the originating format and the exponent bias of the unified format.

19. The method of claim 18 wherein the originating is either a single, double, or extended precision format.

* * * * *